(12) United States Patent
Shinozaki

(10) Patent No.: US 8,582,620 B2
(45) Date of Patent: Nov. 12, 2013

(54) RADIO COMMUNICATION APPARATUS, RADIO BASE STATION, RADIO NETWORK CONTROLLER, AND TRANSMISSION POWER CONTROL METHOD

(75) Inventor: Atsushi Shinozaki, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 1009 days.

(21) Appl. No.: 11/107,796

(22) Filed: Apr. 18, 2005

(65) Prior Publication Data

US 2006/0050771 A1   Mar. 9, 2006

(30) Foreign Application Priority Data

Sep. 9, 2004   (JP) .................................. 2004-263081

(51) Int. Cl.
*H04B 1/707* (2011.01)

(52) U.S. Cl.
USPC .......................................... 375/144; 375/285

(58) Field of Classification Search
USPC .................................................. 375/144, 285
See application file for complete search history.

(56) References Cited

U.S. PATENT DOCUMENTS

| | | | | |
|---|---|---|---|---|
| 5,029,183 | A * | 7/1991 | Tymes | 375/141 |
| 6,658,024 | B1 * | 12/2003 | Okamura | 375/220 |
| 6,675,016 | B2 * | 1/2004 | Lucidarme et al. | 455/452.2 |
| 6,687,723 | B1 * | 2/2004 | Ding | 708/322 |
| 6,748,232 | B1 | 6/2004 | Anderson | |
| 2001/0004604 | A1 * | 6/2001 | Toshimitsu et al. | 455/562 |
| 2002/0002057 | A1 * | 1/2002 | Blanc | 455/522 |
| 2002/0160721 | A1 * | 10/2002 | Kanemoto et al. | 455/69 |
| 2004/0259584 | A1 * | 12/2004 | Murata et al. | 455/522 |
| 2005/0048937 | A1 * | 3/2005 | Sarkar et al. | 455/127.2 |
| 2007/0129096 | A1 * | 6/2007 | Okumura et al. | 455/522 |

FOREIGN PATENT DOCUMENTS

| | | |
|---|---|---|
| CN | 1351783 | 5/2002 |
| JP | 2001-217770 | 8/2001 |
| JP | 2001-285193 | 10/2001 |
| JP | 2003-018089 | 1/2003 |
| JP | 2003032184 | 1/2003 |
| WO | 98/47253 | 10/1998 |

OTHER PUBLICATIONS

Japanese Offce Action for corresponding Japanese Patent Application No. 2004263081, mailed Nov. 18, 2008.
Chinese Patent Office Action dated Apr. 3, 2009. (English Translation Attached).

* cited by examiner

*Primary Examiner* — Michael Neff
(74) *Attorney, Agent, or Firm* — Smith, Gambrell & Russell, LLP

(57) ABSTRACT

To enable transmission power control (outer loop control) considering changes (for example, changes in encoding gain and number of diffusions or the like) in durability for transmission error.
The radio communication apparatus for controlling a target quality of a received signal used for the inner loop power control with outer loop power control. The radio communication apparatus comprises a detector operable to detect a change in durability for transmission error of received data and an update controller operable to execute a gradual update of the target quality for detection of high durability, when the detected durability is low.

11 Claims, 8 Drawing Sheets

|  | RAB SUB-FOLW #1 (CRC BIT is added) | RAB SUB-FLOW #2 | RAB SUB-FLOW #3 |
| --- | --- | --- | --- |
| TRANSPORT BLOCK SIZE (Signaling State) | 81 BIT | 103 BIT | 60 BIT |
| TRANSPORT BLOCK SIZE (Background State) | 39 BIT | 0 BIT | 0 BIT |
| TRANSPORT BLOCK SIZE (Non-Signaling State) | 0 BIT | 0 BIT | 0 BIT |

CODING RATE 1/3 (TAIL BIT = 8 BIT) — applies to RAB SUB-FLOW #1 and #2

CODING RATE 1/2 (TAIL BIT = 8 BIT) — applies to RAB SUB-FLOW #3

| | TFI=0 | TFI=1 | TFI=2 |
|---|---|---|---|
| AUDIO RAB #1 (UL : 12.2 kbps) | 0 bit × 1 | 39 bit × 1 | 81 bit × 1 |
| AUDIO RAB #2 (UL : 12.2 kbps) | 103 bit × 0 | 103 bit × 1 | — |
| AUDIO RAB #3 (UL : 12.2 kbps) | 60 bit × 0 | 60 bit × 1 | — |
| PACKET RAB (UL : 32 kbps) | 336 bit × 0 | 336 bit × 1 | 336 bit × 2 |

(b)

| | TFCI=C0 | TFCI=C1 | TFCI=C2 | TFCI=C3 | TFCI=C4 | TFCI=C5 | TFCI=C6 | TFCI=C7 | TFCI=C8 |
|---|---|---|---|---|---|---|---|---|---|
| AUDIO RAB#1 | TFI=0 | TFI=1 | TFI=2 | TFI=0 | TFI=1 | TFI=2 | TFI=0 | TFI=1 | TFI=2 |
| AUDIO RAB#2 | TFI=0 | TFI=0 | TFI=1 | TFI=0 | TFI=0 | TFI=1 | TFI=0 | TFI=0 | TFI=1 |
| AUDIO RAB#3 | TFI=0 | TFI=0 | TFI=1 | TFI=1 | TFI=0 | TFI=1 | TFI=0 | TFI=0 | TFI=1 |
| PACKET RAB | TFI=0 | TFI=0 | TFI=0 | TFI=1 | TFI=1 | TFI=1 | TFI=2 | TFI=2 | TFI=2 |

Figure 6

RADIO COMMUNICATION APPARATUS, RADIO BASE STATION, RADIO NETWORK CONTROLLER, AND TRANSMISSION POWER CONTROL METHOD

CROSS REFERENCE TO RELATED APPLICATION

This application is related to and claims priority to Japanese Application No. 2004-263081 filed Sep. 9, 2004 in the Japanese Patent Office, the contents of which are incorporated by reference herein.

BACKGROUND OF THE INVENTION

1. Field of the Invention

The present invention relates to an apparatus for transmission power control in a mobile communication system, and a transmission power control method. This apparatus and method can suitably be adapted to an outer loop transmission power control in a mobile communication system which employs the CDMA (Code Division Multiple Access) system such as the W-CDMA (UTRA FDD) system.

2. Description of the Related Art

FIG. 1 illustrates a structure of a conventional mobile communication system.

Mobile communication systems conforming to various systems have been proposed and an example of the W-CDMA (UTRA FDD) mobile communication system will be described here.

In FIG. 1, numeral 1 designates a core network; 2, a radio network controller (RNC); 3, a radio base station (Node B); 4, a user equipment (UE), respectively.

The core network 1 is provided for routing in the mobile communication system. For example, the core network may be formed of the ATM switching network, a packet switching network, a router network, or the like.

The core network 1 is also connected to the other public switching networks (PSTN), enabling a user equipment (mobile station) 4 to communicate with a fixed telephone set.

The radio network controller 2 is considered as a host apparatus of the radio base station 3 and is provided with a function to control (management of radio resources used) these radio base stations 3. Accordingly the RNC can be called a base station controller also.

Moreover, the radio network controller 2 is also provided with a function to execute transmission power control (outer loop transmission power control), which will be described later, and is additionally provided with a hand-over control function to receive, under the hand-over condition, the signal transmitted from a user equipment 4 from a plurality of radio base stations 3 under the control thereof and to transmit selected data of higher quality to the side of the core network 1.

The radio base station 3 communicates with the user equipment 4 under the control of radio resources by the RNC 2.

Moreover, the radio base station 3 is also provided with a function to execute transmission power control (inner loop transmission power control), which will be described later.

The user equipment 4 establishes a radio link to the radio base station 3 when it is present within the radio area thereof and communicates with the other communication apparatus via the core network 1.

In this case, since distance between the user equipment 4 and the radio base station 3 may be changed significantly in some cases, a far-near problem, for example, is generated. However, this problem has been solved by increasing or decreasing the transmission power of the user equipment under instruction from the radio base station 3 through the outer loop transmission power control and inner loop transmission power control.

On the other hand, the transmission power of the radio base station 3 may also be increased or decreased through the outer loop transmission power control and inner loop transmission power control executed by the user equipment 4. Accordingly, multipath interference and the other cell interference may be alleviated.

An interface between the core network 1 and RNC 2 is called the Iu interface, while an interface between the RNCs 2 is called the Iur interface, an interface between the RNC 2 and each radio base station 3 is called the Iub interface, and an interface between the radio base station 3 and the user equipment 4 is called the Uu interface. The network formed by the apparatuses 2 to 3 is particularly called the radio access network (RAN).

Transmission Power Control

Next, transmission power control executed between the radio base station 3 and the user equipment 4 will be described particularly.

Transmission power control is executed for the transmitted signals of the ascending direction (up-link) and the descending direction (down-link). Here, the transmission power control of the transmitted signal in the up-link will be described.

FIG. 2 illustrates a structure of the apparatus for conducting transmission power control of the transmitted signal in the up-link.

Here, the transmission power control is assumed to be executed under the cooperation of the radio base station 3 and the RNC 2.

In FIG. 2, the elements designated by the numerals 10 to 19 are provided in the side of the radio base station 3. Numeral 10 designates an orthogonal detector, 11, a despreading part, 12, a RAKE combiner, 13, a decoder, 14, a second reception quality calculator, 15, a first reception quality measuring part, 16, a first reception quality target administrator, 17, a comparator, 18, a transmission power control signal generator, 19, a transmission processor.

The elements 20, 21 are provided in the side of the radio network controller (RNC) 2. Numeral 20 designates a second reception quality target value administrator and 21, a comparator.

Inner Loop Transmission Power Control

The inner loop transmission power control of the transmission power control will be described first.

The radio signal spread using the spreading code is received with an antenna (not illustrated) from the user equipment 4. Meanwhile, the signal obtained by implementing the frequency conversion or the like is input to the orthogonal detector 10 for separation into the in-phase component and quadrature-phase component which are input to the despreading part 11. Separate illustration of each component is omitted here.

Here, a frame format of the DPCH (Dedicated Physical Channel) of the physical channel (up-link) as the reception object will be described briefly.

FIG. 3 illustrates a frame format of the DPCH.

The DPCH includes both DPDCH and DPCCH as illustrated in the figure.

The DPDCH is a domain for storing data. For example, a transport block (transmission block) including audio data and packet data or the like is multiplexed in this domain.

The DPCCH is a domain for storing control information. The pilot signal (known signal of a predetermined pattern) as the signal used for channel estimation and SIR measurement, the TFCI (Transport Format Combination Indicator) signal indicating the multiplexing condition of the transport block, FBI signal as the signal for controlling closed loop diversity and site selection diversity and the TPC signal as the transmission power control signal for instructing increase or decrease of the transmission power of the signal transmitted to the user equipment 4 from the radio base station 3 are stored to this domain.

The DPDCH is transmitted as the in-phase component on the phase plane with the phase modulation such as QPSK (HPSK), while the DPCCH is also transmitted as the quadrature component.

The despreading part 11 executes the despreading process to the received signal and applies the despread signal to the RAKE combiner 12 and the first reception quality measuring part 15.

The user equipment 4 respectively implements the spreading process using the channelization code for channel separation to the DPDCH and DPCCH and also implements the spreading process using the scrambling code for identification from the other user equipment to both DPDCH and DPCCH. Therefore, the despreading part 11 implements the despreading process using both scrambling code and channelization code.

The first reception quality measuring part 15 measures the first reception quality (for example, SIR (Signal to Interference Ratio)) using the pilot signal included in the DPCCH as the quadrature component of the DPCH and then inputs the result of the measurement to the comparator 17. It is also possible here to conduct the SIR measurement on the basis of the pilot signal after the RAKE combining in the RAKE combiner 12.

The comparator 17 compares the target reception quality (target SIR) given from the first reception quality target administrator 16 with the result of measurement (measured SIR) from the first reception quality measuring part 15 and applies the comparison result to the transmission power control signal generator 18.

The transmission power control signal generator 18 generates, when the measured SIR is smaller than the target SIR based on the comparison result, the TPC signal for instructing an increase in the transmission power and applies this TPC signal to the transmission processor 19.

Meanwhile, when the measured SIR is larger than the target SIR, the transmission power control signal generator 18 generates the TPC signal for instructing decrease of the transmission power and then applies this TPC signal to the transmission processor 19.

The transmission processor 19 transmits the TPC signal to the user equipment 4 together with the other data which must be transmitted to the user equipment 4 via the down-link.

Accordingly, the user equipment 4 increases or decreases the transmission power to the radio base station 3 on the basis of the TPC signal received from the radio base station 3.

As will be apparent from the control method, the received signal from the user equipment 4 is subjected to the transmission power control to make the SIR closer to the target SIR without regardless of the location of the user equipment 4. Accordingly, the far-and-near problem can be solved.

The basic operations of the inner loop transmission power control is described above and the outer loop transmission power control is then described below.

Outer Loop Transmission Power Control

The received signal despread by the despreading part 11 is then input to the decoder 13.

As illustrated in the figure, the decoder 13 is given the data (transport block) stored in the DPDCH and the TFCI signal stored in the DPCCH.

Here, the TFCI is the information indicating the multiplex condition of the transport block stored in the multiplex mode in the DPDCH and a plurality of multiplexed transport blocks can be demultiplexed.

Accordingly, the decoder 13 extracts each transport block on the basis of the TFCI, performs the decoding process to respective blocks (for example, the audio signal can be viterbi-decoded and the packet data can be turbo-decoded), and outputs the result of decoding.

The decoded data is then transmitted to the side of the radio network controller 2 and is also input to the second reception quality calculator 14.

The second reception quality calculator calculates, for example, error quality (CRC error or no CRC error, bit error rate, block error rate, or the like) and transmits the same to the comparator 21 in the side of the radio network controller 2.

Here, a typical method for calculating error quality will be described.

CRCI (Cyclic Redundancy Check Indicator)

CRC check result of the received one transport channel (here, designated as RAB#1 or the like which is one of the channels for transmitting audio data) is measured and the result of the measurement is calculated as error quality.

In particular, the CRC check is conducted using the CRC check bit included in the decoded data obtained by decoding the signal received within the radio frame corresponding to the TTI (Transport Time Interval) period unit (for example, 20 ms) via the transport channel (RAB#1) including the audio data and the check result (including error or non-error) is calculated as the error quality.

The typical error quality calculating method has been described above and the error quality obtained with any of the calculating methods is given to the comparator 21 of the radio network controller 2 via the Iub interface.

The comparator 21 obtains a target value of the second reception quality, which is the quality value required for the transport channel (for example, RAB#1, one of the channels for transmitting the audio data) from a second reception quality target value administrator 20, and compares the same with the reception quality from the second reception quality calculator 14 to perform update control of the target value of the first reception quality administrated (stored) by the first reception quality target value administrator 16.

Namely, when the reception quality calculated by the second reception quality calculator 14 is found to be lower than the target value of the second reception quality as a result of comparison, update control is performed to raise (by addition of +d) the target value (target SIR) of the first reception quality.

Meanwhile, when the reception quality calculated by the second reception quality calculator is found to be higher than the target value of the second reception quality as a result of comparison, the update control is performed to lower (by addition of −d) the target value (target SIR) of the first reception quality.

With the outer loop control as described above, the target SIR is updated on the basis of the reception error quality, it is possible to prevent occurrence of the event that control for increasing transmission power is not performed even when the reception error is lower than the predetermined error quality.

Multi-Call

Finally, encoding process under the multi-call state will be described.

Here, an example where the second reception quality calculator 14 designates the transport channel as the object of calculation of reception quality to the transport channel for transmitting audio data will be described.

FIG. 4 is a diagram for describing multiple processes (for up-link) of the transport channel.

In this figure, $32_1$ to $32_4$ designate encoding processors of each transport channel. 29 designates a transport channel multiplexer; 30, a second interleave part; 31, a physical channel mapping part, respectively.

Here, $32_1$ to $32_3$ designate transport channels for audio data; $32_4$, a transport channel for packet data.

To each transport channel encoding processor $32_1$ to $32_4$, transport block (transmission data block) is input in every TTI from an upper layer.

FIG. 5 is a diagram indicating transport block sizes when the AMR (adaptive multi-rate) encoding (12.2 kbps) is performed on the audio signal input to the user equipment 4.

When the AMR encoding is adopted, the encoded data is output as the data classified into class A (RAB#1), B (RAB#2), and C (RAB#3) in accordance with the importance thereof.

For example, in the signaling state (voice existing state), the data of 81 bits is output as class A in every TTI (for example, 20 ms), the data of 103 bits is output as class B and the data of 60 bits is output as class C.

When the background noise is output, the data of 39 bits is output as class A in every TTI (for example, 20 ms). In this case, the data of class B and class C are not output. In the non-signaling state (voice non-existing state), no data of class A, B, and C is output in every TTI (for example, 20 ms).

Here, the encoding processors $32_1$ to $32_3$ of each transport channel to which the data of classes A, B, and C are input in every TTI perform the encoding process for the input data. The packet data is input in every TTI to the encoding processor $32_4$ of the transport channel, but such packet data is never input when there is no packet data to be transmitted.

For the class A and packet data, the CRC check bit of 12 bits, as the result of CRC calculation conducted by a CRC adder 22, is added. In the case of classes B and C, no CRC check bit is added. Moreover, in the case of class A, the predetermined bits are output as the CRC bits even under the non-signaling state (when 0 bit is input).

The packet data is output, with addition of the CRC check bit, respectively to the transport blocks input in every TTI.

Next, a code block segmentation part 23 divides a code block into a plurality of blocks as required (for example, when the code block is too long, or the like) before the channel encoding process. Each block is then encoded with a channel encoder 24.

The classes A and B are convolution-encoded at an encoding rate of ⅓, while the class C, at an encoding rate of ½, in accordance with a degree of importance. Meanwhile, the packet data is turbo-encoded in the encoding rate of ⅓. In regard to the packet data, each datum to which the CRC check bit is added is preferably turbo-encoded at a time.

The data after the channel encoding is then input to a radio frame equalizer 25 for bit adjustment through addition of bits or the like so that the data can be divided, resulting in no remainder with a value obtained by n=TTI/10 ms.

The data after bit adjustment is interleaved (re-arrangement process) with a first interleave part 26, and is then divided into data portions with a radio frame divider 27. Thereafter, each data portion after the division is then sequentially (for example, in every 10 ms) input to a rate matching part 28.

The rate matching part 28 tries to apply data into the radio frame through repetition and puncture (curtailment) to give redundancy to each data (processed respectively by the encoding processors $32_1$ to $32_4$) in accordance with a degree of importance so that the total sum of the data sequentially output from the encoding processors $32_1$ to $32_3$ of each transport channel is accommodated within one radio frame.

Accordingly, the transport channel multiplexer 29 multiplexes, on the time axis, the transport blocks output, every 10 ms, from the encoding processors $32_1$ to $32_3$ of each transport channel and gives the data to the second interleave part 30 as the data accommodated within one radio frame.

The second interleave part 30 interleaves the data after the multiplex process executes the mapping to the physical channel with the physical channel mapping part 31 to realize signal transmission of the up-link via the physical channel.

By the way, if the state of the multiplexed transport block is not indicated to the radio base station 3, it is very difficult for the radio base station 3 to demultiplex the multiplexed transport blocks.

Therefore, the number of transport blocks (TBs) transmitted in the TTI period and the size of a transport block (TB) are indicated with a value of the transport format indicator (TFI) and moreover a value of the transport format combination indicator (TFCI) is assigned to a combination of the TFI of a radio access bearer.

Here, since the TFCI is the information indicating the state of multiplex process, it may be called the multiplex state information.

Assignment of the transport format indicator (TFI) during the multi-call transmission of the audio transmission (up-link: 12.2 kbps) and the packet transmission (down-link: 32 kbps) and the transport format combination (TFCI) is shown in FIGS. 6A, 6B.

In this case, the transport format combination indicator (TFCI) includes nine indicators C0 to C8, and these indicators are transmitted to the radio base station 3 (Node-B) from the user equipment (UE) 4 via the DPCCH. In the radio base station 3, the decoding process and demultiplex process into the transport block (TB) of each radio access bearer (RAB) are conducted by detecting the transport format with the received transport format combination indicator (TFCI).

As the prior art documents of the present invention, the patent document 1 (Pamphlet of International Laid-Open Patent: No. 47253/1998) describes the CDMA communication method to realize improvement in application efficiency of frequency resources and in communication quality by transmitting the control information (pilot symbol and TPC symbol) through an increase in transmission power only with the designated one individual physical channel in the multi-code transmission. Moreover, the patent document 2 (Japanese Unexamined Patent Publication No. 2001-217770) describes transmission power control to eliminate the occurrence of mismatching in the outer loop control before and after execution of the hand-over connection. Moreover, the patent document 3 (Japanese Unexamined Patent Publication No. 2001-285193) describes the outer loop transmission control to maintain the predetermined communication quality respectively in a plurality of channels even when only one bit may be used as the transmission control bit to the user equipment from the base station. Moreover, the patent document 4 (Japanese Unexamined Patent Publication No. 2003-18089) describes the radio communication apparatus, which can maintain the reception quality to the desired quality regardless of change in the propagation environment in the outer loop transmission power control.

When the calculation object of the second reception quality for the outer loop transmission power control during the multi-call process is designated to the channel (transport channel) for data transmission (for example, CRC bit described previously) even in the non-signaling state, it is preferable because the outer loop transmission power control can be executed continuously more than that when the object is designated to the channel for the packet data transmission.

However, a problem is usually generated when the outer loop transmission power control is executed on the basis of the data which allows change of the encoding rate.

For example, when the CRC bit is added, in C bits, to the audio data X(bit) and the data is encoded by the convolution-encoding process (encoding rate: ⅓), the number of bits Y after the encoding is expressed by the following formula.

$$Y = (X+C+T) \times 3$$

Where, T is the number of tail bits coupled to the last part of the code block before the encoding process. T is 8 bits. C is the number of CRC check bits and it is 12 bits.

Here, the encoding rate in the signaling state is obtained accurately. Since X is 81, $$R1 = (X+C)/\{(X+C+T) \times 3\}$$
$$= (81+12)/(81+12+8) \times 3$$
$$= 1/3.26$$

Moreover, the encoding rate in the background noise state is obtained accurately. Since X=39, $$R2 = (X+C)/\{(X+C+T) \times 3\}$$
$$= (39+12)/(39+12+8) \times 3$$
$$= 1/3.47$$

Moreover, the encoding rate in the non-signaling state is obtained accurately. Since X=0, $$R3 = (X+C)/\{(X+C+T) \times 3\}$$
$$= 12/\{(12+8) \times 3\}$$
$$= 1/5$$

Even when the convolution-encoding rate is set identically to ⅓, the encoding rate in the non-signaling state becomes small because the rate of the tail bits becomes high in the number of bits input to the encoder. Accordingly, the encoding rate becomes smaller in the sequence of the signaling state, background noise state, and non-signaling state.

Since bit error is corrected to a larger extent in the decoding process when the encoding rate is smaller, error quality calculated by the second reception quality calculator 14 for the data in the non-signaling state becomes higher than that in the background noise state and the error quality calculated by the second reception quality calculator 14 for the data in the background noise state becomes higher than that in the signaling state.

Therefore, as illustrated in FIG. 7, the packet and DCCH are likely to be controlled to satisfy the desired quality in the signaling state because the target SIR is update-controlled with the outer loop control to satisfy the predetermined quality of the AMR on the basis of the error quality of AMR calculated by the second reception quality calculator 14 but the packet and DCCH does not satisfy the respective desired quality in the non-signaling state because the error quality of AMR calculated by the second reception quality calculator 14 shows comparatively higher quality and thereby the target SIR is lowered by the outer loop control.

Moreover, when the data obtained by conducting the error correction encoding (channel encoding) and then executing the interleave process to the transmitting block is transmitted through division into a plurality of radio frames, if the number of radio frames N at the dividing destination changes, the durability for burst error when a value of N becomes larger is intensified. Therefore, excellent error quality can be calculated with the second reception quality calculator 14, resulting in a similar problem.

When the data as the object of monitoring by the second reception quality calculator is not audio data but other data such as packet data, durability for burst errors may also be considered to change due to changes in encoding rate and the number of radio frames N at the dividing destination.

Moreover, even in the single-call state in place of the multi-call state, if the target value of the first reception quality is lowered because the non-signaling state is continued in the audio data, a problem is also generated, in which reception fails in the signaling state.

SUMMARY OF THE INVENTION

Accordingly, an object of the present invention is to solve the problem of outer loop control when the encoding rate changes.

Another object of the present invention is to solve the problem of outer loop control when the number of radio frames N at the dividing destination changes.

Finally, it is an object of the present invention to realize the transmission power control (outer loop transmission power control) by taking into consideration changes in durability for transmission error (for example, changes in encoding rate and the number of divisions or the like).

In one embodiment of the present invention, a radio communication apparatus for controlling target quality of the received signal used for inner loop transmission power control with outer loop transmission power control, the radio communication apparatus comprises a detector for detecting a change in durability for transmission error of the received data, and an update controller for executing an update of the target quality, when higher durability is detected through the detecting process, slower than the update of the target quality when lower durability is detected through the detecting process.

Preferably the slower update is executed by reduction of update width of target quality or elongation of the update period.

Preferably the change in durability is detected on the basis of the interleave period.

Preferably the change in durability is detected on the basis of data length in unit of encoding.

In one embodiment of the present invention, a transmission power control method for controlling target quality of the received signal used for inner loop transmission power control with outer loop transmission power control, comprises the steps of detecting a change in durability for transmission error of the received data, and executing an update of the target quality, when higher durability is detected through the detecting process, slower than update of the target quality when lower durability is detected through the detecting process.

In one embodiment of the present invention, a radio base station for comparing the reception quality of the pilot signal from a user equipment with a first reception quality and transmitting the transmission power control signal to the user equipment in accordance with the comparison result, the radio base station comprises a transmitter for transmitting the reception error measurement result information of the data transmitted from the user equipment and the information of the durability for transmission error, and a first reception quality administrator for updating the first reception quality in accordance with the update control for the first reception quality by a radio network controller on the basis of the information from the transmitter.

Preferably an object for identifying reception error is an audio data transmission channel executed transmission even under the non-signaling state or a packet transmission channel.

In one embodiment of the invention, a radio base station for comparing reception quality of the pilot signal from a user equipment with a first reception quality and transmitting the transmission power control signal to the user equipment in accordance with the comparison result, the radio base station comprises a second reception quality calculator for measuring reception error of the data transmitted from the user equipment, a transmitter for transmitting the signal to a radio base station controller after correction of a reception error measured by using the information of durability for transmission error, and a first reception quality administrator for updating the first reception quality in accordance with the update control of the first reception quality by the radio network controller on the basis of the information transmitted from the transmitter.

In one embodiment of the invention, a radio base station for comparing reception quality of the pilot signal from a user equipment with a first reception quality and transmitting the transmission power control signal to the user equipment in accordance with the comparison result, the radio base station comprises a transmitter for transmitting error information to a radio network controller by measuring a reception error of the data transmitted from the user equipment, and a first reception quality administrator for updating the first reception quality in accordance with a indication of an update control for the first reception quality by the radio network controller on the basis of the information transmitted from the transmitter, wherein the first reception quality administrator executes update control of the first reception quality, when durability for transmission error between the user equipment and the radio base station is high, slower than the update of the first reception quality when the durability for transmission error is low.

In one embodiment of the present invention, a radio network controller for receiving at least a measuring result of a reception error from a radio base station, which compares reception quality of pilot signals transmitted by a user equipment with a first reception quality, transmits transmission power controlling signals to the user equipment based on the result of the comparison and measures the reception error for data transmitted by the user equipment, the radio network controller comprises an update controller for executing the update control of the first reception quality, when durability for transmission error is high, slower than the update control of the first reception quality when the durability for transmission error is low on the basis of the measuring result of the reception error and the durability information for transmission error between the user equipment and radio base station.

In one embodiment of the invention, a radio communication apparatus for controlling target quality of the received signal used for inner loop transmission power control with outer loop transmission power control, the radio communication apparatus comprises an update controller for considering an audio data transmission channel as an object for monitoring the outer loop transmission power control and for executing update of the target quality slower in a non-signaling state than in a signaling state.

BRIEF DESCRIPTION OF THE DRAWINGS

FIG. 5 shows data sizes in audio data communication.
FIG. 6 shows the relationship between TFC and TFCI.

DETAILED DESCRIPTION OF THE PREFERRED EMBODIMENTS

The preferred embodiments of the present invention will be described with reference to the accompanying drawings.

[a] First Embodiment

In the first embodiment, changes in durability for transmission error (for example, changes in coding rate and number of divisions or the like) are detected and the transmission power control (outer loop transmission power control) is executed in accordance with the result of detection.

Figure 1:
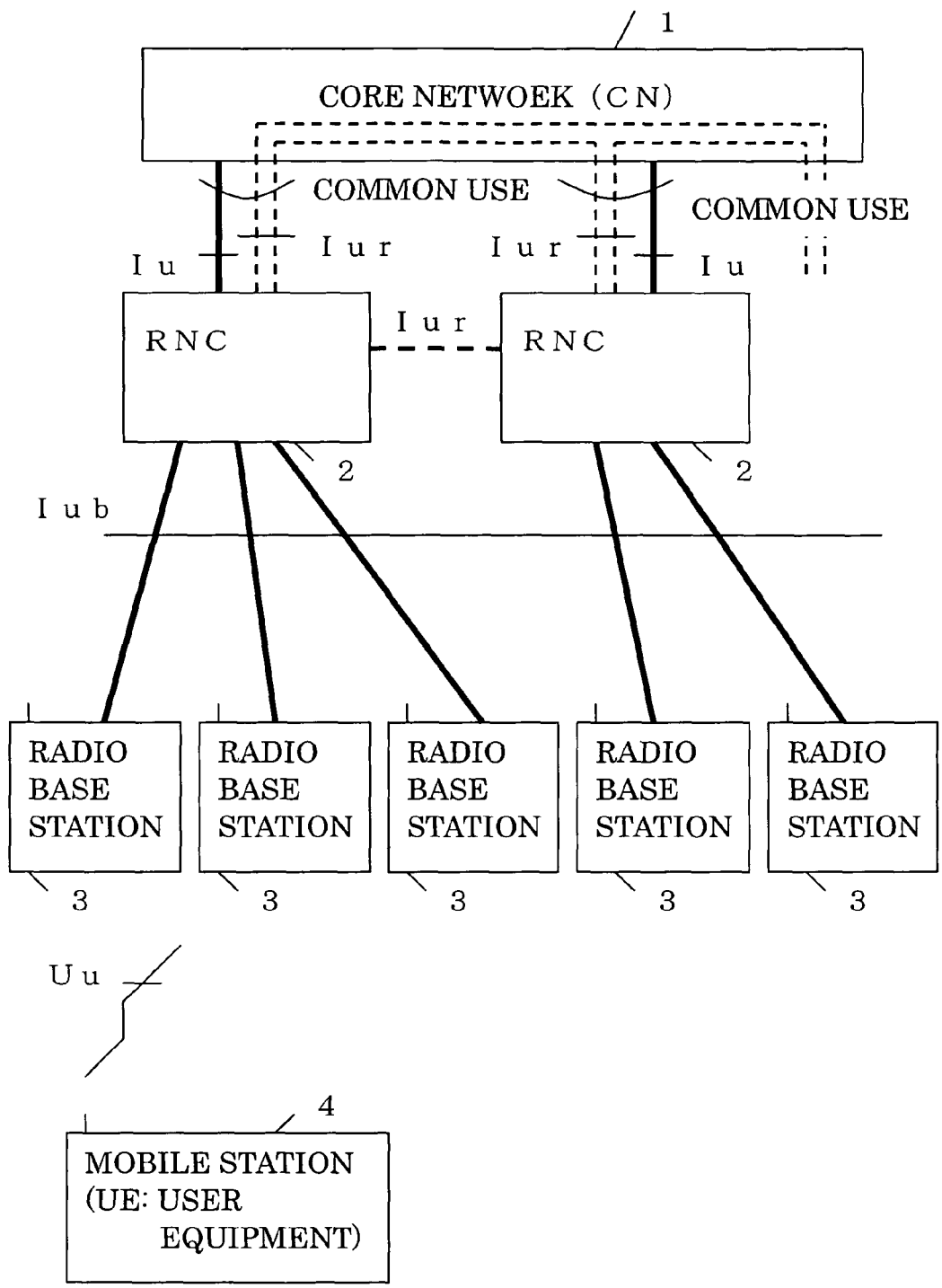
FIG. 1 shows a mobile communication system.
Figure 2:
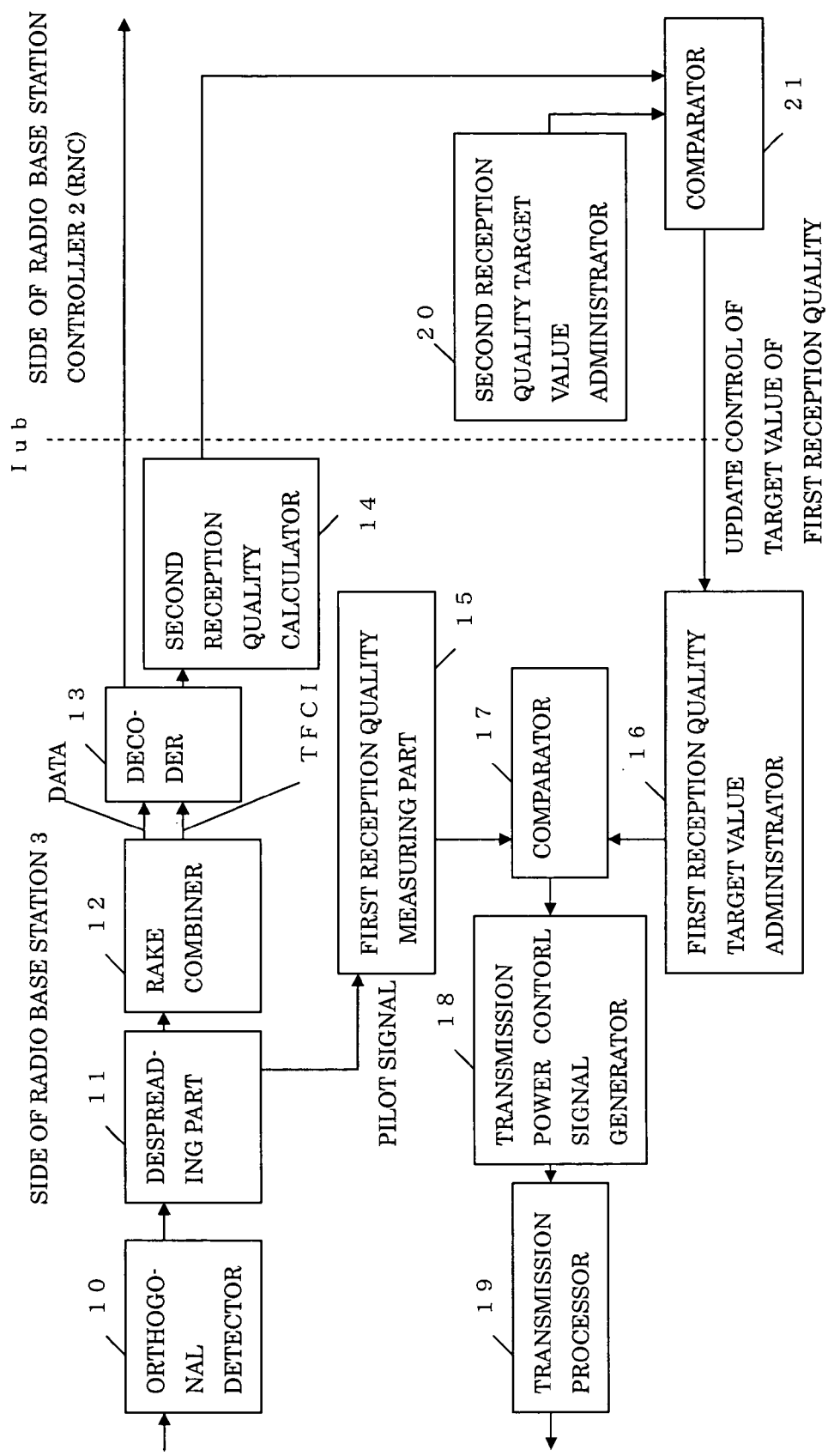
FIG. 2 shows a structure of the apparatus for transmission power control.
Figure 3:
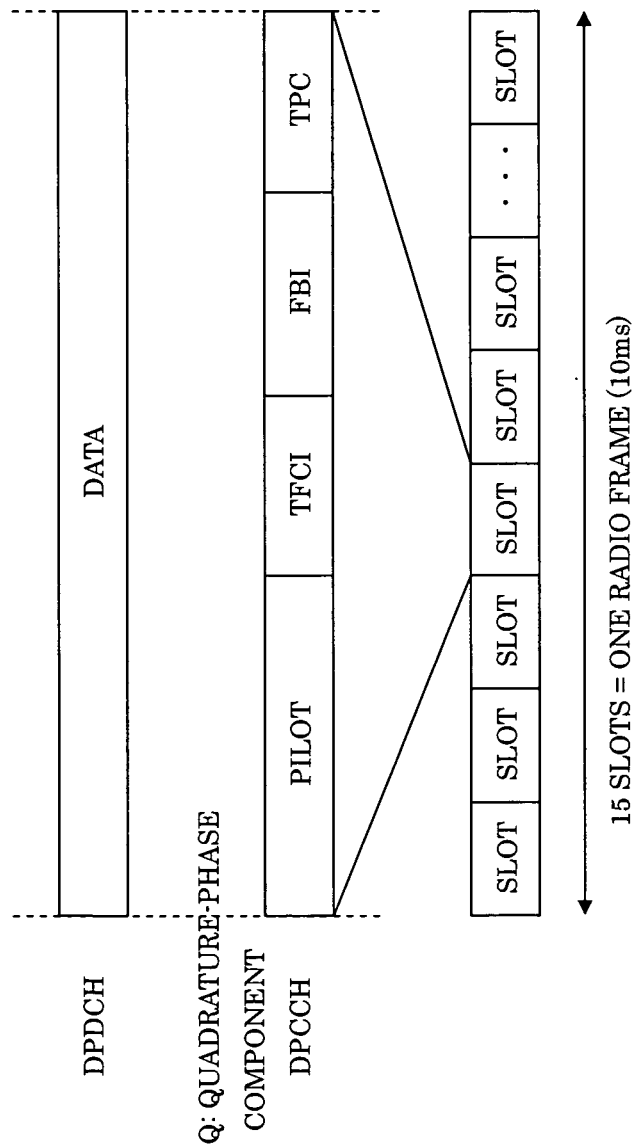
FIG. 3 shows a DPCH frame format of up-link.
Figure 4:
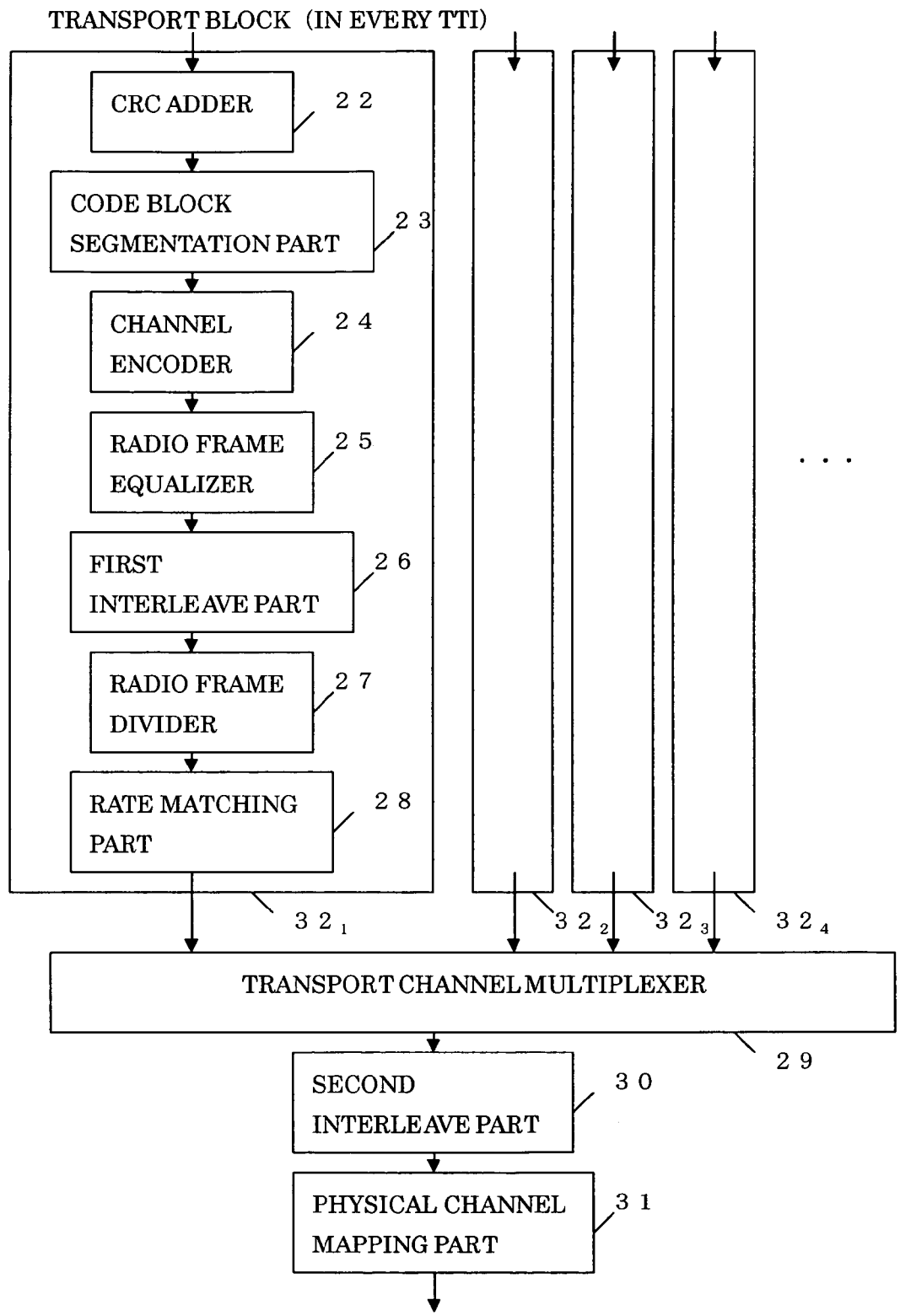
FIG. 4 shows a multiplex method of transport channel.
Figure 7:
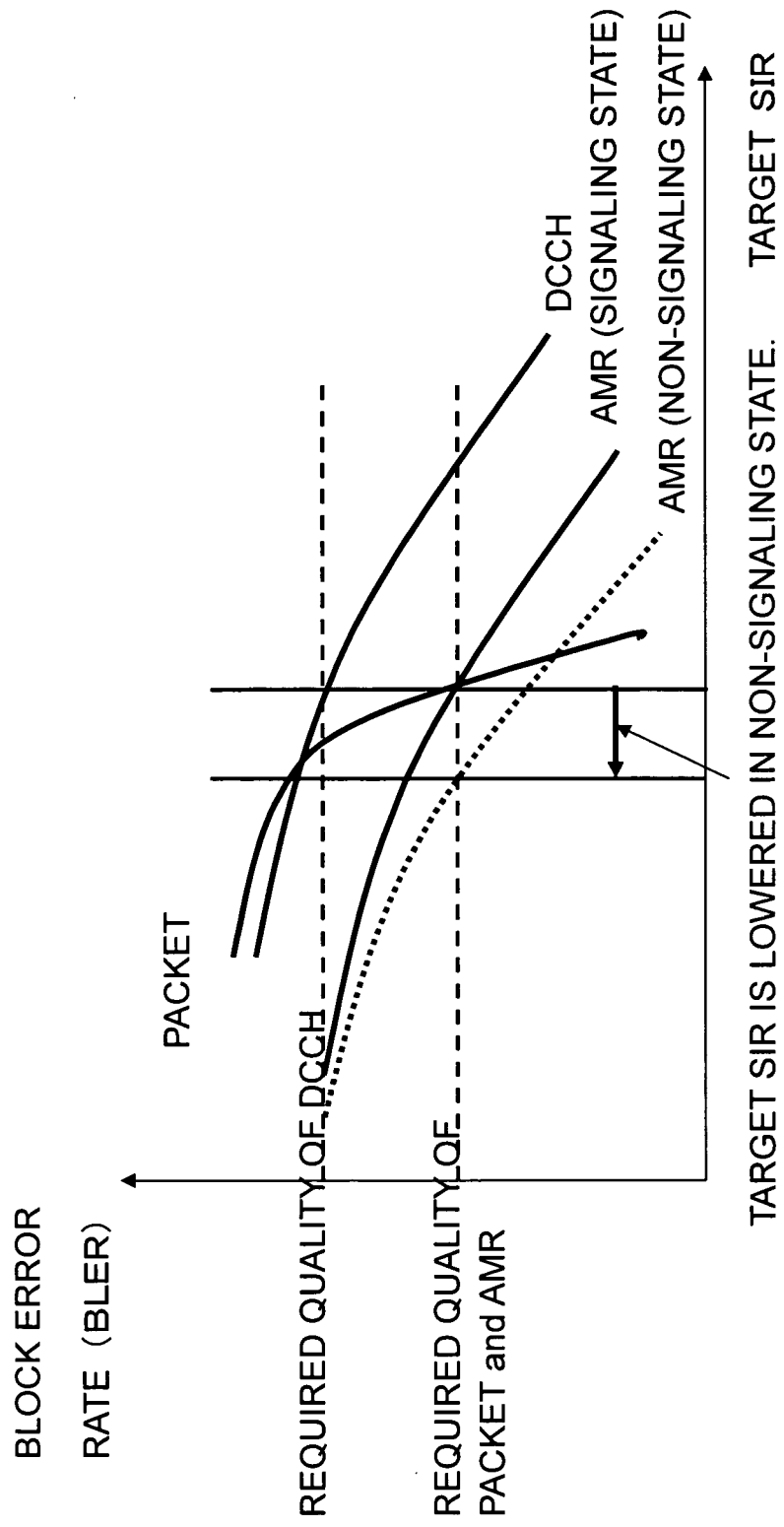
FIG. 7 shows the relationship between the target SIR and block error.

The structure of the basic mobile communication system utilizes a structure of the WCDMA (UTRA FDD) mobile communication system shown in FIG. 1. It is also possible to introduce a change in which a part or the entirety of the functions of the radio network controller RNC 2 and the radio base station 3 are integrated into a node.

Moreover, for the frame structure of the up-link, the data size of audio communication, and TFCI, those similar to that shown in FIG. 3 to FIG. 6 may be employed.

Figure 8:
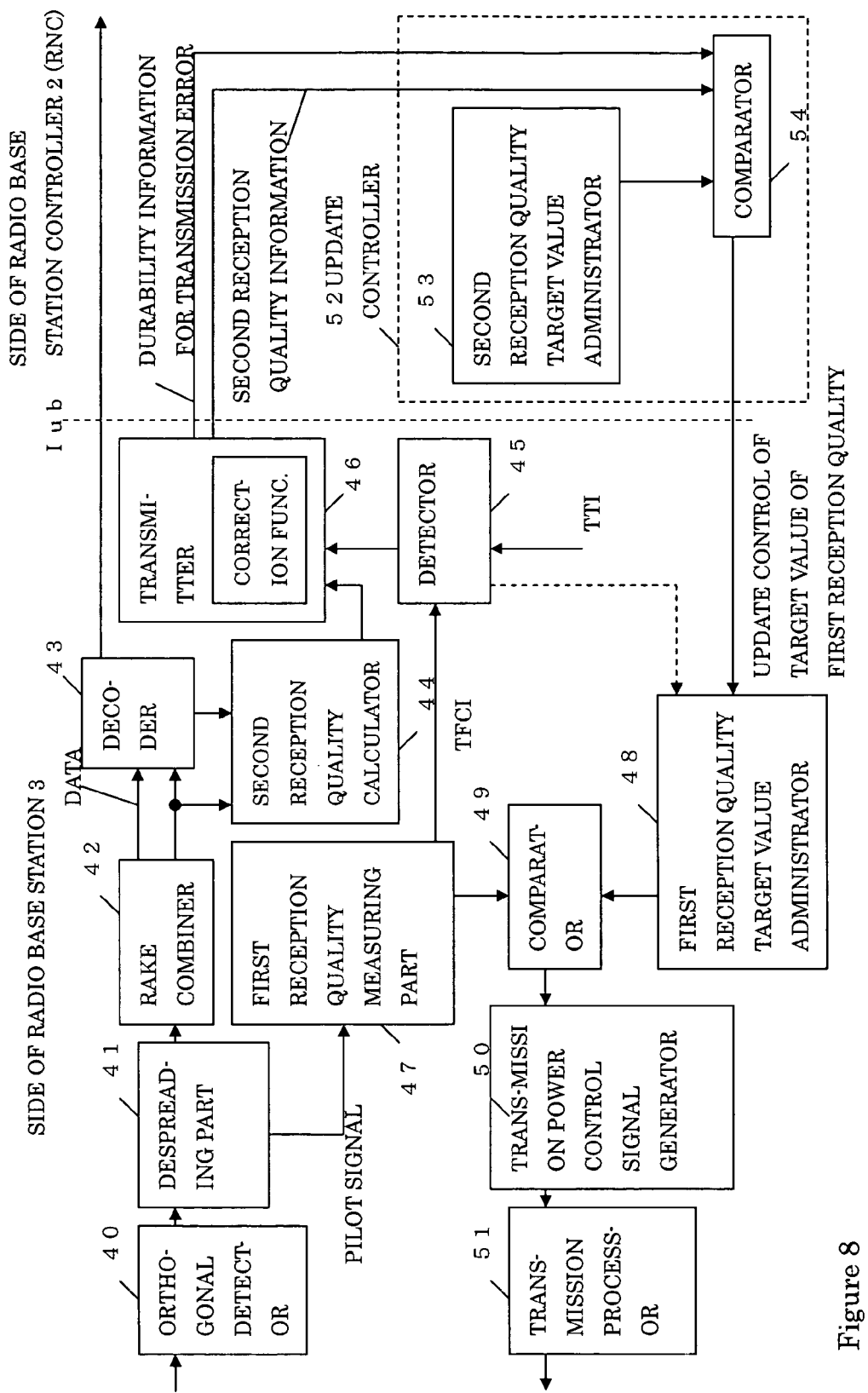
FIG. 8 shows a structure of the apparatus for transmission power control of the present invention.

FIG. 8 shows a structure of the apparatus for executing transmission power control (for up-link) in relation to this embodiment.

A radio communication apparatus may be formed by combining the radio base station 3 and the radio network controller RNC 2. This figure illustrates an example where each function is allocated to the radio base station 3 and RNC 2, respectively.

In this structure, the elements 40 to 51 are provided in the side of the radio base station 3. Numeral 40 designates an orthogonal detector; 41, an despreading part; 42, a RAKE combiner; 43, a decoder; 44, a second reception quality calculator; 45, a detector; 46, a transmitter; 47, a first reception quality measuring part; 48, a first reception quality target value administrator; 49, a comparator; 50, a transmission power control signal generator; 51, a transmission processor.

Numerals 52 to 54 designate elements provided in the side of the radio network controller (RNC) 2. Numeral 52 designates an update controller; 53, a second reception quality target value administrator; and 54, comparator.

Inner Loop Transmission Power Control

The inner loop transmission power control among the transmission power controls will be described first.

The radio signal which has been spread using the spreading code is received from a user equipment 4 through an antenna (not illustrated). Meanwhile, the signal obtained by implementing a process such as frequency conversion to such radio signal is then input to the orthogonal detector 40 and is then input to the despreading part 41 after separation into an in-phase component and a quadrature-phase component. Illustration of each separated element is omitted here.

The despreading part 41 despreads the received signal and applies the signal after the despreading process to the RAKE combiner 42 and the first reception quality measuring part 47.

The user equipment 4 performs, for example, to DPDCH and DPCCH respectively, the spreading process using the channel equalization code for channel separation and also performs the spreading process using the scrambling code for discriminating other user equipment from the user equipment 4. Accordingly, the despreading part 41 executes the despreading process using both scrambling code and channelization code.

The first reception quality measuring part 47 measures a first reception quality (for example, SIR (Signal to Interference Ratio)) using the pilot signal included in the DPCCH which is the quadrature component of the DPCH and then inputs the result of the measurement to the comparator 49. Measurement of SIR can also be executed on the basis of the pilot signal after the RAKE combining in the RAKE combiner 42.

The comparator 49 compares the target reception quality (target SIR) given from the first reception quality target value administrator 48 with the result of the measurement (measured SIR) from the first reception quality measuring part 47 and applies the result of comparison to the transmission power control signal generator 50.

The transmission power control signal generator 50 generates, when the measured SIR is smaller than the target SIR, the TPC signal for instructing an increase of the transmission power on the basis of the result of comparison and applies this TPC signal to the transmission processor 51.

Meanwhile, when the measured SIR is larger than the target SIR, this generator generates the TPC signal for instructing a decrease of the transmission power and then applies this TPC signal to the transmission processor 51.

The transmission processor 51 transmits the TPC signal to the user equipment 4 together with the other data to be transmitted to the user equipment 4 via the down-link.

Accordingly, the user equipment 4 increases or decreases the transmission power of the transmitting signal destined for the radio base station 3 on the basis of the TPC signal received from the radio base station 3.

As will be apparent from the control method described above, since the received signal from the user equipment 4 is subjected to the transmission power control to approximate the SIR to the target SIR without regard to the location of the user equipment 4, the far-and-near problem can be solved.

The basic operation of the inner loop transmission power control has been described above and the outer loop transmission power control will the described next.

Outer Loop Transmission Power Control

The despread received signal from the despreading part 41 is input to the decoder 43.

As illustrated in the figure, the data stored in the DPDCH (transport block) and the TFCI signal stored in the DPCCH are applied to the decoder 43.

Here, the TFCI is the information indicating the multiplex state of the transport block stored in the DPDCH in the multiplexed state and can demultiplex a plurality of transport blocks in the multiplexed state.

Accordingly, the decoder 43 extracts each transport block on the basis of the TFCI and executes the decoding process on each transport block (for example, viterbi decoding for the audio data and turbo decoding for the packet data) in order to output the result of decoding.

The decoded data is then transmitted as user data to the side of the radio network controller 2 and is also input to the second reception quality calculator 44.

The second reception quality calculator 44 calculates, for example, error quality (CRC error or no-CRC error, block error rate, or the like) and then applies the result of the calculation to the transmitter 46.

Of course, the CRCI described previously may be used as a method of calculating error quality.

On the other hand, the detector 45 detects changes in durability for transmission error in the received data from the user equipment 4 and then applies the result of detection to the transmitter 46.

In this example, changes in durability are detected using the TFCI information received from the user equipment 4 via the DPCCH and the TTI information applied from a upper layer processor (not illustrated).

Coding Rate

When the coding rate changes as described above, durability for transmission error also changes.

For example, when the second reception quality calculator 44 designates the audio data (RAB#1 in FIG. 5 and FIG. 6) as the object of error quality calculation, the coding rate changes respectively in the signaling state, background noise state, and non-signaling state. The source for change in the coding rate can be identified as signaling state, background noise state, or non-signaling state from the TFI which is determined by the TFCI. Accordingly, changes in durability can also be detected using the TFCI.

In the example of FIG. 6B, TFCI=C0, C3, C6 indicate the non-signaling state, while TFCI=C1, C4, C7 indicate the background noise state and TFCI=C2, C5, C8 indicate signaling state. Therefore, a change to the background noise state from the non-signaling state can be detected by a change of TFCI to C1 from C0 and a decrease of durability can be detected. Moreover, a change to the signaling state from the background noise state can be detected from a change of TFCI to C2 from C1 and therefore decrease of durability can also be detected.

Of course, a change of signaling state or the like can be detected with another method, but in any case the durability information is applied to the transmitter 46 in accordance with the result of the detection.

As an example of the durability information, ranking is possible, such as signaling state=11, background noise state=01, and non-signaling state=00, (binary expression) is possible and moreover the ranking of such as signaling state, background noise state=1, non-signaling state=0 or signaling state=1 background noise state, non-signaling state=0 (binary expression) is also possible.

Since a true change in the coding rate occurs not only due to the influence of the tail bit but also by dynamic change of the coding rate itself of the convolutional coding (for example, change to ⅓ from ½), when the coding rate is changed dynamically, an increase of durability can also be indicated to the transmitter 46.

However, in this case, it is preferable for the detector 45 to detect a change in the coding rate information based on the received signal from the user equipment 4 or based on the notification from the upper layer.

When the second reception quality calculator 44 calculates the reception quality of the data as being different from the audio data, it is sufficient to obtain the coding rate information of the channel as the calculation object in accordance with such calculation.

Moreover, when turbo encoding is employed, since the longer the data length in units of the encoding is, the higher the error correction capability is, if it is required to monitor the channel as the object of turbo encoding, it is preferable to evaluate a size of the transport block with the TFCI and durability is judged to be high when the size is larger.

TTI

The detector 45 can also use the TTI information. On the occasion of executing the error correction encoding (channel encoding) on the transmission block and the data obtained through the interleave process is transmitted through division into a plurality of radio frames, if the number of radio frames at the dividing destination changes, durability to burst error is increased as the value of N becomes larger.

Accordingly, when the TTI becomes larger (for example, changed to 30 ms from 20 ms), durability can be increased.

Therefore, it is preferable that the durability information corresponding to a value of the TTI is applied to the transmitter 46 utilizing the fact described above.

For example, the durability information is given to the transmitter 46 through the ranking (binary expression) such as durability=11 (TTI=40 ms), durability=10 (TTI=30 ms), durability=01 (TTI=20 ms), and durability=00 (TTI=10 ms).

Meanwhile, the transmitter 46 transmits the durability information from the detector 45 and reception quality (for example, CRCI) calculated by the second reception quality calculator to the radio network controller 2 via the Iub interface.

In this case, the durability obtained on the basis of the coding rate and the durability obtained on the basis of the TTI may be transmitted and a value corresponding to the combination of such durabilities may also be transmitted.

When the function of indicating the TFI to the RNC 2 via the Iub interface is originally provided, the TFI information is input to the update controller 52 or the TFI information may also be input to the update controller 52 after it is converted into the durability information with the converter (not shown) in the RNC 2.

This method is preferable from the viewpoint of not increasing the traffic on the Iub because it is not required to particularly transmit the durability information on the Iub.

Moreover, in regard to the TTI information, when this information is originally administrated by the RNC 2, the TTI information is input to the update controller 52 from the administrator for the TTI (not shown) or the TTI information is input to the update controller 52 after it is converted to the durability information with the converter (not shown) in the RNC 2.

The update controller 52 receives the second reception quality information and durability information to execute update control of the target value (target quality) of the first reception quality administrated by the first reception quality target administrator 48.

Namely, the comparator 54 obtains, from the second reception quality target value administrator 53, the target value of the second reception quality, which is the quality value required for the transport channel (for example, RAB#1 which is one of the channels for transmitting the audio data), compares this target value with the second reception quality information from the transmitter 46, and executes update control of the target value of the first reception quality administrated (stored) by the first reception quality target value administrator 48.

When the reception quality calculated by the second reception quality calculator is found, by the comparison, to be lower than the target value of the second reception quality, the update control is performed to raise (by addition of +d) the target value (target SIR) of the first reception quality.

Meanwhile, when the reception quality calculated by the second reception quality calculator is found, by the comparison, to be larger than the target value of the second reception quality, the update control is executed to decrease (by addition of −d) the target value (target SIR) of the first reception quality.

However, in this case, the update control is conducted also considering durability.

Basically, the update of the target value of the first reception quality, when the higher durability is indicated, is slower than the update of the target value of the first reception quality, when the lower durability is indicated. But an example of the slower update is described below.

Control Depending on Update Width

When higher durability is indicated, the width of variation with single update is set small by making small a value of d to indicate that durability is low (in other words, a value of d is increased to indicate that durability is high). Of course, it is preferable that the width be changed step by step in accordance with the durability.

Control Depending on Update Period

The update period TH corresponding to an indication that durability is high is set longer than the update period TL corresponding to an indication that durability is low (TH>TL). (In other words, the update period TL corresponding to an indication that durability is low is set shorter than the update period TH corresponding to an indication that durability is high.)

Accordingly, the first reception quality target value administrator 48 executes the update of the target quality, when high durability is detected, slower than the update of the target quality when low durability is detected.

With the process described above, if durability becomes high, the outer loop transmission power control is not suspended but rapid decrease of the first target quality (target SIR) can be prevented with the slow control. Moreover, if reception error quality becomes too bad although durability is high, the target SIR may be raised with the slow outer loop control.

It is also preferable that only a slow decrease of the target SIR is executed and slow control is not introduced for increase of the target SIR.

When durability becomes high, the slow control is canceled and the first target quality (target SIR) is naturally controlled adequately. Accordingly, for example, a decrease in quality exceeding the predetermined level of the other data under the multi-call state can be suppressed.

For the single-call state, a decrease in quality exceeding the predetermined level of data when durability is reduced again with influence of the target SIR updated when durability is high can also be prevented.

[b] Second Embodiment

In this embodiment, a correction function can be provided to the transmitter 46.

Namely, the transmitter 46 acquires the measured second reception quality from the second reception quality calculator 44 and also acquires the durability information from the detector 45 to compensate for the second reception quality information based on the durability information.

For example, when durability is high, the second reception quality is corrected to a lower level to indicate that error quality is bad.

The transmitter 46 controls the outer loop control slower by transmitting the corrected second reception quality to the side of the radio network controller 4 slower than control based on the actual error quality directly.

The comparator 45 performs, without particular attention to durability, the update control of the target value (target SIR) of the first reception quality in accordance with the comparison of the corrected second reception quality with the target value of the second reception quality from the second reception quality target value administrator 53.

As a result, since a quick decrease of the target value (target SIR) of the first reception quality may be changed to a slow decrease under the condition that durability is high, a decrease in quality exceeding the predetermined level of the other data in the multi-call state, for example, can be suppressed.

Even in the single-call state, a decrease in quality exceeding the predetermined level of the data when durability becomes low again due to the influence of the target SIR updated when durability is high can also be prevented.

[c] Third Embodiment

In this embodiment, the durability information is applied to the first reception quality target value administrator 48.

The transmitter 46 transmits at least the second reception quality calculated by the second reception quality calculator 44 to the side of the radio network controller 2, but is not required to transmit the durability information.

On the other hand, the first reception quality target value administrator 48 acquires the durability information from the detector 45 and executes, even when low durability is indicated, slow update of the target value of the first reception quality when high durability is indicated.

Namely, the update control is performed with the update controller 52 without consideration of durability. However, when the acquired durability information indicates that durability is high, the slow update control is performed as in the case where the update width is narrowed for notification from the radio network controller 2 like the control in accordance with the update width or as in the case where the update control is executed in the update period of once among n times (n: natural number equal to 2 or larger) for the notification from the radio network controller 2 like the control in accordance with the update period described above.

As described above, since a rapid decrease in the target value (target SIR) of the first reception quality may be changed to a slow decrease on the condition that durability is high, a decrease in quality exceeding the predetermined level of the other data in the multi-call state can be suppressed.

Even in the single-call state, a decrease in quality exceeding the predetermined level of the data when durability becomes low again due to the influence of the target SIR updated when durability is high can also be prevented.

The outer loop transmission power control described above in each embodiment can also be introduced into that of the user equipment 4.

Namely, each structure of the radio base station 3 and radio network controller 2 shown in FIG. 1 is provided within the user equipment 4 to realize the inner loop transmission power control and outer loop transmission power control for the down-link signal. Thereby, the TPC command can be transmitted to the radio base station 3 on the basis of the result.

In this case, when the radio format is changed (for example, corresponding to WCDMA), the TFCI, pilot signal, TCP, and data or the like in the changed format may be used.

According to the present invention, the problem of outer loop transmission power control when an coding rate changes can be solved.

Moreover, according to the present invention, the problem of outer loop transmission power control when the number of radio frames at the dividing destination changes can be solved.

Moreover, according to the present invention, the transmission power control (outer loop transmission power control) considering changes in durability (for example, changes in encoding rate and the number of divisions or the like) for transmission error can be realized.

What is claimed is:

1. A radio communication apparatus comprising:
    a measurer configured to measure a first reception quality of received data;
    a first comparator configured to compare the first reception quality with a first target quality;
    a generator configured to generate a signal indicative of power controlling in accordance with the comparison result;
    a calculator configured to calculate a second reception quality of the received data;
    a detector configured to detect a change in a durability for transmission error of the received data based on at least one of a Transport Format Combination Indicator and a Transport Time Interval (TTI), the durability being indicative of an encoding rate or a number of divisions,
    a second comparator configured to compare the change in the durability for transmission error of the received data, the second reception quality, and a second reception quality target quality; and
    an update controller configured to execute an update of the first target quality in accordance with the compared change in the durability, the second reception quality, and the second reception quality target quality.

2. The radio communication apparatus according to claim 1, wherein the update is executed by reduction of update width of target quality or elongation of an update period.

3. The radio communication apparatus according to claim 1, wherein the durability is detected based on an interleave period.

4. The radio communication apparatus according to claim 1, wherein the durability is detected based on a data length in a unit of encoding.

5. A transmission power control method, comprising:
    measuring a first reception quality of received data;
    comparing the first reception quality with a first target quality;
    generating a signal indicative of power controlling in accordance with the comparison result;
    calculating a second reception quality of the received data;
    detecting a change in a durability for transmission error of the received data based on at least one of a Transport Format Combination Indicator and a Transport Time Interval (TTI), the durability being indicative of an encoding rate or a number of divisions;
    comparing the change in the durability for transmission error of the received data, the second reception quality, and a second reception quality target quality; and
    executing an update of the first target quality in accordance with the compared change in the durability, the second reception quality, and the second reception quality target quality.

6. A radio base station comprising:
    a measurer configured to measure a first reception quality of received data;

a first comparator configured to compare the first reception quality with a first target quality;
a generator configured to generate a signal indicative of power controlling in accordance with the comparison result;
a calculator configured to calculate a second reception quality of the received data;
a transmitter operable to transmit the signal indicative of power controlling based on change in the durability for transmission error of the received data, the change in the durability for transmission error based on at least one of a Transport Format Combination Indicator and a Transport Time Interval (TTI), the durability being indicative of an encoding rate or a number of divisions,
a second comparator configured to compare the change in the durability for transmission error of the received data, the second reception quality, and a second reception quality target quality; and
a first reception quality administrator configured to execute an update of the first target quality in accordance with the compared change in the durability, the second reception quality, and the second reception quality target quality.

7. The radio base station according to claim 6, wherein an object for identifying reception error is an audio data transmission channel executed transmission under a non-signaling state or a packet transmission channel.

8. A radio base station comprising:
a measurer configured to measure a first reception quality of received data;
a first comparator configured to compare the first reception quality with a first target quality;
a generator configured to generate a signal indicative of power controlling in accordance with the comparison result;
a calculator configured to calculate a second reception quality of the received data;
a transmitter configured to transmit the signal indicative of power controlling to a radio base station controller based on a detected change in the durability for transmission error of the received data, the change in the durability for transmission error based on at least one of a Transport Format Combination Indicator and a Transport Time Interval (TTI), the durability being indicative of an encoding rate or a number of divisions;
a second comparator configured to compare the change in the durability for transmission error of the received data, the second reception quality, and a second reception quality target quality; and
a first reception quality administrator configured to execute an update of the first target quality in accordance with the compared change in the durability, the second reception quality, and the second reception quality target quality.

9. A radio base station for comprising:
a measurer configured to measure a reception quality of received data from a user equipment;
a first comparator configured to compare the reception quality with a first target quality;
a generator configured to generate a signal indicative of power controlling in accordance with a comparison result of the first comparator;
a calculator configured to calculate a second reception quality of the received data;
a transmitter configured to transmit error information to a radio network controller based on the measured reception quality of data transmitted from the user equipment; and
a first reception quality administrator configured to execute an update to the first target quality in accordance with a comparison result from a second comparator of a detected change in durability for transmission error of the received data, the second reception quality, and a second reception quality target quality;
the durability is indicative of an encoding rate or a number of divisions and is based on at least one of a Transport Format Combination Indicator and a Transport Time Interval (TTI).

10. A radio network controller comprising:
a measurer configured to measure a reception quality of received data from a user equipment;
a first comparator configured to compare the reception quality with a first target quality;
a generator configured to generate a signal indicative of power controlling in accordance with a comparison result of the first comparator;
a calculator configured to calculate a second reception quality of the received data;
an update controller configured to execute an update control of the first reception quality in accordance with a comparison result from a second comparator of a detected change in a durability for transmission error of the received data, the second reception quality, and a second reception quality target quality, wherein the durability is indicative of an encoding rate or a number of divisions and is based on at least one of a Transport Format Combination Indicator and a Transport Time Interval (TTI).

11. A radio communication apparatus comprising:
a measurer configured to measure a first reception quality of received data from an audio data transmission channel;
a first comparator configured to compare the reception quality with a first target quality;
a generator configured to generate a signal indicative of power controlling in accordance with a comparison result of the first comparator;
a calculator configured to calculate a second reception quality of the received data;
an update controller configured to execute an update of the first target quality in accordance with a comparison result from a second comparator of a detected change in a durability for transmission error of the received data, the second reception quality, and a second reception quality target quality, wherein the durability is indicative of an encoding rate or a number of divisions and is based on at least one of a Transport Format Combination Indicator and a Transport Time Interval (TTI).

* * * * *